United States Patent [19]

Tanaka et al.

[11] Patent Number: 4,705,692
[45] Date of Patent: Nov. 10, 1987

[54] SUBSTITUTE COMPOSITION FOR COCOA BUTTER

[75] Inventors: Yukitaka Tanaka; Yuichi Irinatsu, both of Hasakimachi; Aiko Noguchi, Kasumimachi; Takashi Kobayashi, Hasakimachi, all of Japan

[73] Assignee: Kao Corporation, Tokyo, Japan

[21] Appl. No.: 21,110

[22] Filed: Mar. 3, 1987

[30] Foreign Application Priority Data

Mar. 11, 1986 [JP] Japan .................................. 61-53353

[51] Int. Cl.$^4$ .............................................. A23D 5/00
[52] U.S. Cl. ..................................... 426/607; 426/601
[58] Field of Search ......................................... 426/607

[56] References Cited

U.S. PATENT DOCUMENTS

| 3,706,576 | 11/1968 | Claverly et al. | 426/607 |
| 4,199,611 | 4/1980 | Toyoshima et al. | 426/607 |
| 4,613,514 | 9/1986 | Maruzeni et al. | 426/607 |

Primary Examiner—Raymond N. Jones
Assistant Examiner—Celine Callahan
Attorney, Agent, or Firm—Flynn, Thiel, Boutell & Tanis

[57] ABSTRACT

A substitute composition for cocoa butter comprises 5 to 60% by weight of an oleaginous composition (A) and 40 to 95% by weight of another oleaginous composition (B), (A) an oleaginous composition which comprises 40 to 100% by weight of mixed acid triglyceride(s) containing 15 to 70% by weight of saturated fatty acid(s) having 20 to 24 carbon atoms and 20 to 60% by weight of unsaturated fatty acid(s) having 16 to 22 carbon atoms as constituent fatty acids and containing at least one saturated fatty acid residue having 20 to 24 carbon atoms and at least one unsaturated fatty acid residue having 16 to 22 carbon atoms per molecule; and (B) an oleginous composition which contains at least 70% by weight of 1,3-disaturated-2-oleoylglycerols comprising 1,3-dipalmitoyl-2-oleoylglycerol, 1-palmitoyl-2-oleoyl-3-stearoylglycerol and 1,3-distearoyl-2-oleoylglycerol and shows a weight ratio of stearic acid to palmitic acid in the constituent fatty acid residues of 1.5:1 to 6.0:1.

1 Claim, No Drawings

SUBSTITUTE COMPOSITION FOR COCOA BUTTER

This invention relates to a substitute composition for cacao or cocoa butter. In particular, it relates to a substitute composition for cocoa butter which exhibits a remarkable resistance to blooming in hard butter products including chololates.

PRIOR ARTS

A hard butter such as cacao fat or cocoa fat is widely used in the food industry confectionary and baking. It is required that a hard butter would sustain a satisfactory hardness at room temperature or below and rapidly melt around bodily temperature. Namely it should have an extremely narrow plastic region. Cacao butter begins to be softened at approximately 30° to 32° C. and completely melts at approximately 36° C. These melting behaviors contribute to the characteristics of hard butter products, such as refreshingness or spread taste.

However these hard butter products would seem as if they were coated with white powder when exposed to large changes in temperature. This phenomenon is called fat blooming and deteriorates not only the appearance of a product but also the taste and texture thereof to thereby damage the commercial value of the same.

It is generally believed that the fat blooming as described above is caused by changes in the crystalline structure, i.e., polymorphism of the employed cacao or hard butter. For example, the most stable crystalline structure of cacao butter, which is a representative hard butter, is of $\beta$-type. Cacao butter crystals in an unstable form such as $\beta'$-type present in a chocolate would cause phase transition into a more stable $\beta$-form followed by crystal growth upon storage, thus inducing fat blooming. Thus a conventional process for manufacturing a chocolate include a tempering step wherein unstable crystals are converted into stable ones as much as possible to thereby suppress the transition and growth of the crystals, i.e., blooming upon storage.

Although this tempering step in the manufacture of a chocolate is effective in suppressing fat blooming to some extent, the surface of the chocolate would melt when stored for a prolonged period of time or exposed to a large change in temperature and some portion of the unstable crystals of the cacao butter would melt and migrate to the surface. The molten fat on the surface would recrystallize and the formed crystals would grow repeatedly. Thus the continuous oleaginous phase gradually becomes heterogenous, which results in fat blooming. Accordingly it is difficult to store hard butter products for a prolonged period of time under unsettled temperature conditions. Thus it has been required to establish a process for inhibiting or significantly suppressing fat blooming.

There have been developed various substitutes for cacao butter of excellent properties obtained from natural fats and oils containing a large amount of 1,3-disaturated-2-oleoylglycerol. Examples of these substitutes for cacao butter are illipe fat, shea fat, sal fat, palm oil and mango kernel oil. Advances in the techniques for fractionating these natural fats and blending fractions available as hard butters have brought about substitutes for cacao butter almost comparable thereto. These substitutes show high compatibilities with cacao butter and excellent meltability. However fat blooming, which is the largest disadvantage of cacao butter, can be neither inhibited nor significantly suppressed thereby.

Further it has been attempted to develop fat blooming inhibitors as additives. For example, the phase transition of crystals of cacao butter or other hard butters can be inhibited or suppressed by adding 10 to 30% by weight, based on the total oleaginous components of a chocolate, of glyceride(s) containing fatty acid residue(s) having a small number of carbon atoms and those having a large number of the same in a certain ratio to thereby inhibit fat blooming (cf. Japanese Patent Publications No. 26823/1971 and No. 26824/1971); the resistance against fat blooming of a chocolate can be enhanced by incorporating 0.1 to 8.0% by weight of a steroid compound into the oleaginous components of the chocolate to thereby suppress uneven distribution, aggregation and migration of specific components therein (cf. Japanese Patent Laid-Open No. 60945/1983); and fat blooming of a chocolate can be inhibited by microcrystallizing fat crystals in the chocolate by adding 0.2 to 10% by weight, based on the total oleaginous components, of a high-melting oleaginous material containing a long-chain saturated fatty acid (behenic acid) to thereby suppress the formation of coarse crystals (cf. Japanese Patent Laid-Open No. 198245/1983).

PROBLEMS TO BE SOLVED BY THE INVENTION

As described above, there have been attempted to provide improved processes for the production of substitutes for cacao butter and to develop fat blooming inhibitors in order to inhibit fat blooming of hard butter products including chocolates. In particular, the development of fat blooming inhibitors aims at enhancing the resistance against fat blooming of hard butter products including chocolates by suppressing the uneven distribution, aggregation and migration of unstable fat crystals in these products, by converting the fat crystals into microcrystals and by suppressing the transition of unstable crystals into stable ones.

However none of conventional processes can give a satisfactory effect of inhibiting fat blooming of hard butter products including chocolates, which is caused by the melting of oleaginous components contained therein, when stored for a prolonged period of time or exposed to large changes in temperature with time or seasons. Thus it has been urgently required to establish a process for suppressing or inhibiting fat blooming of a chocolate upon prolonged storage, even at such a high temperature that some portion of the chocolate might melt or under conditions wherein significantly large changes in temperature might occur.

MEANS FOR SOLVING THE PROBLEMS

We have studied to solve these problems as described above. As a result, we have found that a substitute composition for cacao butter, wherein mixed acid triglyceride(s) mainly comprising saturated fatty acid(s) having 20 to 24 carbon atoms and unsaturated fatty acid(s) having 16 to 22 carbon atoms are blended in a particular ratio with 1,3-disaturated-2-oleoylglycerols showing a particular ratio (by weight; the same applies hereinbelow) of stearic acid to palmitic acid in the constituent fatty acids, can significantly suppress fat blooming of hard butter products stored under unsettled temperature conditions, thus completing the present invention.

The present invention relates to a substitute composition for cocoa or cacao butter which comprises 5 to 60% by weight of an oleaginous composition (A) and 40 to 95% by weight of another oleaginous composition (B) each as specified below:

(A) an oleaginous composition which comprises 40 to 100% by weight of mixed acid triglyceride(s) containing 15 to 70% by weight of saturated fatty acid(s) having 20 to 24 carbon atoms and 20 to 60% by weight of unsaturated fatty acid(s) having 16 to 22 carbon atoms as constituent fatty acids and containing at least one saturated fatty acid residue having 20 to 24 carbon atoms and at least one unsaturated fatty acid residue having 16 to 22 carbon atoms per molecule; and (B) an oleaginous composition which contains at least 70% by weight of 1,3-disaturated-2-oleoylglycerols comprising 1,3-dipalmitoyl-2-oleoylglycerol, 1-palmitoyl-2-oleoyl-3-stearoylglycerol and 1,3-distearoyl-2-oleoylglycerol and shows a weight ratio of stearic acid to palmitic acid in the constituent fatty acid residues of 1.5:1 to 6.0:1.

The substitute composition for cacao butter of the present invention comprises two oleaginous compositions, i.e., the abovementioned oleaginous compositions (A) and (B).

The oleaginous composition (A) constituting the substitute composition for cacao butter of the present invention, i.e. an oleaginous composition which comprises 40 to 100% by weight of mixed acid triglyceride(s) containing 15 to 70% by weight of saturated fatty acid(s) having 20 to 24 carbon atoms and 20 to 60% by weight of unsaturated fatty acid(s) having 16 to 22 carbons atoms as constituent fatty acids and containing at least one saturated fatty acid residue having 20 to 24 carbon acid and at least one unsaturated fatty acid residue having 16 to 22 carbon atoms, would crystallize in the form of extremely fine plates when slowly or rapidly cooled after melting. The fine plates thus formed can be stored as such for a prolonged period of time without undergoing crystal growth. Further the oleaginous composition (A) shows additional specific crystalline propertiese which are never observed in usual fats such that it converts crystals of other fats into fine ones and suppresses the growth of the obtained fine crystals when blended therewith.

On the other hand, another oleaginous composition (B) constituting the substitute composition for cacao butter of the present invention, i.e., an oleaginous composition which comrpises at least 70% by weight of 1,3-disaturated-2-oleoylglycerols comprising 1,3-dipalmitoyl-2-oleoylglycerol, 1-palmitoyl-2-oleoyl-3-stearoylglycerol and 1,3-distearoyl-2-oleoylglycerol and has a weight ratio of stearic acid to palmitic acid in the constituent fatty acid residues of 1.5:1 to 6.0:1, shows a high compatibility with cacao butter and a remarkable heat stability. The oleaginous composition (B) can exhibit a satisfactory heat stability simultaneously with maintaining a high compatibility with cacao butter, since it contains at least 70% by weight of the 1,3-disaturated-2-oleoylglycerol similar to cacao butter together with a larger amount of stearic acid than the latter, i.e., a larger amount of 1-palmitoyl-2-oleoyl-3-stearoylglycerol and 3-distearoyl-2-oleoylglycerol. When the rate of stearic acid to palmitic acid is smaller than 1.5:1, the hardness and heat stability of the composition are lowered. On the other hand, when the ratio exceeds 6.0:1, the tempering conditions in the manufacture of hard butter products are highly restricted and the meltability and texture of the products are lowered.

As described above, the substitute composition for cacao butter of the present invention can exert a synergistic effect of inhibiting fat blooming simultaneously with maintaining basic properties required of a hard butter, i.e., satisfactory hardness, meltability and texture, since the particular oleaginous composition (A) exerting effects of forming fine crystals and suppressing the growth of the crystals is blended with the oleaginous composition (B) having a high compatibility with cacao butter and an excellent heat stability.

Main fatty acids constituting the oleaginous composition (A) include saturated fatty acids having 20 to 24 carbon atoms, preferably arachic and behenic acids, and unsaturated fatty acids having 16 to 22 carbon atoms, preferably those having 18 carbon atoms such as oleic, linolic and linolenic acids. The triglyceride(s) which are the main component of the oleaginous composition (A) are dibehenyl monolinolenate or dibehenyl monooleate wherein some portion of the saturated fatty acids may be replaced by palmitic, stearic or arachic acid or a mixture thereof.

The oleaginous composition (B) substantially comprises three 1,3-disaturated-2-oleoylglycerols, i.e., 1,3-dipalmitoyl-2-oleoylglycerol (POP), 1-palmitoyl-2-oleoyl-3-stearoylglycerol (POSt) and 1,3-distearoyl-2-oleoylglycerol (StOSt) and has a ratio of stearic acid to palmitic acid in the constituent fatty acid residues of 1.5:1 to 6.0:1.

Now, nonlimiting examples of processes for preparing the oleaginous compositions (A) and (B) constituting the substitute composition for cacao butter of the present invention will be given.

PREPARATION OF OLEAGINOUS COMPOSITION (A)

The oleaginous composition (A) is obtained by transesterifying behenic acid triglyceride(s) or fatty acid triglyceride(s) containing at least 30% by weight of saturated fatty acid(s) having 20 or more carbon atoms, such as extremely hardened high-erucic rapeseed oil, and a vegetable oil containing at least 60% by weight of unsaturated fatty acid(s), such as soybean, olive, rapeseed or safflower oil and/or a mixture thereof, in the presence of a catalyst such as sodium methylate. The properties of the composition (A) can be further improved by fractionating the transesterified oil to thereby remove trisaturated triglycerides, which show poor meltability, and triunsaturated triglycerides, which lower the hardness of the product.

PREPARATION OF OLEAGINOUS COMPOSITION (B)

An oleaginous material containing a large amount of oleic acid at the 2-position, such as palm oil, olive oil, shea fat, sal oil and/or fractionated fats obtained therefrom, and stearic acid and/or palmitic acid are subjected to selective transesterification at the 1,3-positions in the presence of an enzyme, which selectively acts on the 1,3-positions of glycerides, e.g., a lipase originating from *Rhizopus delemar*. From the oil thus transesterified, fatty acids are removed and the residue is subjected to solvent fractionation to collect a fraction mainly comprising 1,3-disaturated-2-oleoylglycerols. Thus the oleaginous composition (B) constituting the substitute composition for cacao butter of the present invention is obtained.

The substitute composition for cacao butter of the present invention consists of the oleaginous composition (A), i.e., mixed acid triglyceride(s) mainly comprising saturated fatty acid(s) having 20 to 24 carbon atoms and unsaturated fatty acid(s) having 16 to 22 carbon atoms and the oleaginous composition (B), i.e., 1,3-disaturated-2-oleoylglycerols having a specified ratio of stearic acid to palmitic acid in the constituent fatty acid. The oleaginous composition (A) may be blended with the oleaginous composition (B) over a wide range of a blending ratio. However it is practically desirable that the substitute composition for cacao butter of the present invention comprises 5 to 60% by weight of the oleaginous composition (A) and 40 to 95% by weight of the oleaginous composition (B) since preferable properties as a hard butter such as sensitive melting behaviors and solidifiability in the production of a hard butter as well as a high resistance against fat blooming can be achieved thereby.

By completely or partially replacing cacao butter contained in a hard butter product such as a chocolate by the substitute composition for cacao butter of the present invention, fat blooming of the hard butter product stored under unsettled temperature conditions can be inhibited or significantly suppressed. Thus the substitute composition for cacao butter of the present invention can impart a high resistance against fat blooming, which can be achieved by neither cacao butter nor conventional hard butters, to the hard butter product.

The invention further provides a preferable embodiment in which the hard butter product comprises 0.5 to 30 percent by weight of a solid fat and the solid fat forms a homogeneous gel solid having a yield value of $5 \times 10^4$ dyn/cm$^2$ by adding 20% by weight of said fat blooming inhibitor to rapeseed oil, slowly cooling the mixture at a rate of 0.1° C./minute from a temperature higher by 10° C. than the melting point of the fat to a temperature at which the crystal content (solid fat content) thereof as determined by NMR according to Basic Analytical Method for Fats and Oils, T3-1983, Temporary Solid Fat Content as specified by the Japan Oil Chemists' Society, and storing the mixture at the temperature giving the solid fat content of 10 for one hour; wherein the term "yield value" as used herein means a force required for destroying the structure of the system and is determined according to the following equation:

yield value $(dyn/cm^2) = a \times 980/S$, wherein a (g) is a stress at the point when the structure of the system is destroyed by applying a load thereto at a constant rate and S (cm$^2$) is the area to which the load is applied.

A yield value to use in the above defined embodiment is determined with the use of a rheometer (NRM-2010JCW; mfd. by Fudo Kogyo Co., Ltd.) and a disc adaptor of 10 mm in diameter. A sample is raised at a rate of 20 mm/minute. Whem the load by which the sample is destroyed is a g, the yield value Y can be calculated according to the following equation:

$Y(dyn/cm^2) = a \times 980/0.785$.

We have found that the growth of crystals of hard butter type oleaginous materials such as cacao fat, which is frequently observed, can be suppressed, i.e., fat blooming can be suppressed by using an oleaginous material which is present in the form of fine crystals without any growth even when dissolved in a large amount of an oil and slowly cooled, i.e., under conditions wherein the growth of crystals is liable to occur and capable of solidifying the system as a gel, thus completing the present invention.

The substitute composition for cacao butter of the present invention comprising the oleaginous compositions (A) and (B) is effective in significantly suppressing fat blooming of hard butter products including chocolates at a high temperature or under unsettled temperature conditions, which could not be achieved by prior arts, since the component (A) converts fat crystals in these products into fine forms and disperses the same while the component (B) imparts a high heat stability to the products. Accordingly the substitute composition for cacao butter of the present invention is highly useful as a starting material for hard butter products including chocolates.

EXAMPLES

To further illustrate the present invention, the following Preparative Examples and Examples will be given wherein all percentages, parts and blending ratios of the oleaginous compositions (A) and (B) are by weight. Examples for the preparation of oleaginous composition (A):

(A)-1

A mixture comprising 50% by weight of behenic acid triglyceride (fatty acid composition: 2.4% of stearci acid, 9.9% of arachic acid and 84.9% of behenic acid) and 50% by weight of olive oil (fatty acid composition: 10.9% of palmitic acid, 3.7% of stearic acid, 80.5% of oleic acid and 5.0% of linolic acid) was transesterified with the use of 0.1% by weight based on the oleaginous mixture of sodium methylate as a catalyst at 80° C. for 30 minutes. The obtained oil was dissolved in 4 ml/g of n-hexane and cooled from 40° to 28° C. under stirring. The high-melting fraction thus precipitated was filtered off. After distilling off the solvent, the filtrate was dissolved in 5 ml/g of acetone and cooled from 30° to 10° C. under stirring. Then the aimed fraction thus precipitated was collected. After distilling off the solvent, this fraction was purified in a conventional manner to give an oleaginous composition (A)-1.

(A)-2

A mixture comprising 50% by weight of behenic acid triglyceride (fatty acid composition: 2.4% of stearic acid, 9.9% of arachic acid and 84.9% of behenic acid) and 50% by weight of safflower oil (fatty acid composition: 6.9% of palmitic acid, 2.7% of stearic acid, 13.0% of oleic acid and 76.0% of linolic acid) was transesterified with the use of 0.1% by weight based on the oleaginous mixture of sodium methylate as a catalyst at 80° C. for 30 minutes. The obtained oil was dissolved in 4 ml/g of n-hexane and cooled from 40° to 28° C. under stirring. The high-melting fraction thus precipitated was filtered off. After distilling off the solvent, the filtrate was dissolved in 5 ml/g of acetone and cooled from 30° to 10° C. under stirring. Then the aimed fraction thus precipitated was collected. After distilling off the solvent, this fraction was purified in a conventional manner to give an oleaginous composition (A)-2.

(A)-3

A mixture comprising 50% by weight of extremely hardened high-erucic rapeseed oil (fatty acid composition: 3.9% of palmitic acid, 41.3% of stearic acid, 5.5% of arachic acid and 46.9% of behenic acid) and 50% by weight of safflower oil (fatty acid composition: 6.9% of palmitic acid, 2.7% of stearic acid, 13.0% of oleic acid and 76.0% of linolic acid) was transesterified with the use of 0.1% by weight based on the oleagnious mixture of sodium methylate as a catalyst at 80° C. for 30 minutes. The obtained oil was dissolved in 5 ml/g of acetone and cooled to 35° C. under stirring. The high-melting fraction thus precipitated was filtered off. The filtrate was further cooled to 10° C. under stirring and the crystals thus precipitated were collected. After distilling off the solvent, the crystals were purified in a conventional manner to give an oleaginous composition (A)-3.

(A)-4

A mixture comprising 50% by weight of extremely hardened high-erucic rapeseed oil (fatty acid composition: 3.9% of palmitic acid, 41.3% of stearic acid, 5.5% of arachic acid and 46.9% of behenic acid) and 50% by weight of rapeseed oil (fatty acid composition: 3.9% of palmitic acid, 1.8% of stearic acid, 57.1% of oleic acid, 21.9% of linolic acid, 9.6% of linolenic acid, 3.1% of eicosenoic acid and 1.1% of erucic acid) was transesterified with the use of 0.1% by weight based on the oleaginous mixture of sodium methylate as a catalyst at 80° C. for 30 minutes. The obtained oil was dissolved in 5 ml/g of acetone and cooled to 31° C. under stirring. The high-melting fraction thus precipitated was filtered off. The filtrate was further cooled to 10° C. under stirring and the crystals thus precipitated were collected. After distilling off the solvent, the crystals were purified in a conventional manner to give an oleaginous composition (A)-4.

Table 1 shows the analytical data of the oleaginous compositions (A)-1 to (A)-4 as obtained above. Table 2 shows the glyceride compositions thereof determined by the gas chromatography.

Examples for the preparation of oleaginous composition (B):

REFERENTIAL EXAMPLE 1

Preparation of Palm Medium-Melting Fraction

One part (by weight; the same applies hereinafter) of refined palm oil having an iodine value of 52.1 was dissolved in four parts of n-hexane and stirred at −18° C. for three hours. Then the crystals were separated from the filtrate. After dissolving the crystals, n-hexane was added thereto to give an oleaginous concentration of 18% and the mixture was cooled to 0° C. After stirring the mixture for one hour, the crystals thus precipitated were filtered off. After distilling off the solvent, the filtrate was purified in a conventional manner to give 0.22 part of a palm medium-melting fraction which will be abbreviated as PMF hereinafter.

REFERENTIAL EXAMPLE 2

Preparation of Shea Fat Medium-Melting Fraction

One part of deoxidized and decolored shea fat having an iodine value of 62.1 was dissolved in four parts of n-hexane and cooled to 4° C. After stirring the mixture for one hour, the crystals thus precipitated were filtered off. The filtrate was further cooled to −15° C. and stirred for three hours. Then the crystals were separated from the filtrate. After distilling off the solvent, the crystals were purified in a conventional manner to give 0.4 part of a shea fat medium-melting fraction which will be abbreviated as SMF hereinafter.

(B)-1

300 parts of the PMF as obtained in Referential Example 1 and 450 parts of stearic acid were dissolved in 2000 parts of n-hexane. Then three parts of a lipase capable of selectively transesterifying at the 1,3-positions (*Rhizopus delemar* lipase; mfd. by Tanabe Seiyaku Co., Ltd.) adsorbed by 30 parts of celite was added thereto and the mixture was stirred at 40° C. for 72 hours to thereby effect selective 1,3-position transesterification. After the completion of the reaction, insoluble matters comprising a mixture of the celite and the lipase were filtered off from the crude reaction product and free fatty acids were removed in a conventional manner. The obtained oil was dissolved in 1500 parts of acetone and cooled to 20° C. under stirring. The high-melting fraction thus precipitated was filtered off. The filtrate was further cooled to 10° C. and stirred for three hours and the crystals thus precipitated were collected. After distilling off the solvent, the crystals were purified in a conventional manner to give 195 parts of a sample (B)-1 as the component (B) constituting the substitute composition for cacao butter of the present invention.

TABLE 1

| Oleag. composn. | Yield(*) (%) | $I_2$ value | M.P. (°C.) | Fatty acid composition | | | | | | | |
|---|---|---|---|---|---|---|---|---|---|---|---|
| | | | | Palmitic acid | Stearic acid | Oleic acid | Linolic acid | Linolenic acid | Aracnic acid | Behenic acid | Lignoceric acid |
| (A)-1 | 43.7 | 32.5 | 43.2 | 4.5 | 2.4 | 28.2 | 3.8 | 0.3 | 4.7 | 53.4 | 2.0 |
| (A)-2 | 46.9 | 56.8 | 41.9 | 3.7 | 2.4 | 4.9 | 29.8 | 0.1 | 3.2 | 53.9 | 2.0 |
| (A)-3 | 32.6 | 53.7 | 42.1 | 4.3 | 17.3 | 3.7 | 28.6 | 0.1 | 6.8 | 38.8 | 1.4 |
| (A)-4 | 40.1 | 45.9 | 37.8 | 3.1 | 19.6 | 27.6 | 8.0 | 3.0 | 6.0 | 29.9 | 1.2 |

(*)Yield based on transesterified oil.

TABLE 2

| Oleag. composn. | Triglyceride composition (%)(*) | | | | | | |
|---|---|---|---|---|---|---|---|
| | C52 | C54 | C56 | C58 | C60 | C62 | C64 |
| (A)-1 | 0.5 | 2.5 | 9.6 | 24.6 | 12.2 | 42.1 | 2.6 |
| (A)-2 | 0.8 | 2.4 | 7.8 | 28.8 | 11.9 | 47.5 | 0.9 |
| (A)-3 | 2.6 | 9.2 | 7.2 | 34.7 | 7.6 | 38.3 | 0.4 |
| (A)-4 | 4.9 | 22.2 | 14.1 | 38.3 | 3.6 | 3.8 | 0.4 |

(*)Mainly comprising:
C52; PStU
C54; St$_2$U
C56; AStU
C58; A$_2$U, BStU
C60; ABU
C62; B$_2$U
C64; B$_2$A
wherein
P; palmitic acid;
St; stearic acid;
U; unsaturated C$_{18}$ acids;
A; aracnic acid; and
B; behenic acid.

(B)-2

40 parts of the PMF as obtained in Referential Example 1 was blended with 60 parts of the SMF as obtained in Referential Example 2 to give a sample (B)-2 as the component (B) constituting the substitute composition for cacao butter of the present invention.

(B)-3

Simialr to the case as described in (B)-1, 300 parts of the PMF as obtained in Referential Example 1 and 450 parts of stearic acid were dissolved in 2000 parts of n-hexane and three parts of a lipase capable of selectively transeterifying at the 1,3-positions (*Rhizopus delemar* lipase; mfd. by Tanabe Seiyaku Co., Ltd.) adsorbed by 30 parts of celite was added thereto. Thus transesterification was effected by stirring the mixture at 40° C. for 72 hours. After the completion of the reaction, insoluble matters comprising a mixture of the celite and the lipase were filtered off from the crude reaction product and free fatty acids were removed from the filtrate in a conventional manner. The obtained oil was dissolved in 1500 parts of acetone and cooled to 20° C. under stirring. The crystals thus precipitated were filtered off. The filtrate was further cooled to 0° C. and stirred for three hours. The crystals thus precipitated were collected and purified in a conventional manner after distilling off the solvent. Thus 215 parts of a sample (B)-2 as the component (B) constituting the substitute composition for cacao butter of the present invention was obtained.

Table 3 shows the analytical data of the oleaginous compositions thus obtained.

TABLE 3

| Oleag. composn. | I$_2$ value | M.P. (°C.) | Fatty acid composition (%) | | | | (*)SOS content (%) | Stearic acid/ palmitic acid |
| | | | Palmitic acid | Stearic acid | Oleic acid | Linolic acid | | |
|---|---|---|---|---|---|---|---|---|
| Ref. Ex. 1 (PMF) | 33.4 | 34.2 | 57.5 | 6.1 | 32.4 | 2.8 | 82.8 | 0.11 |
| Ref. Ex. 2 (SMF) | 34.1 | 37.8 | 5.4 | 55.7 | 31.6 | 3.1 | 80.1 | 10.31 |
| (B)-1 | 30.1 | 34.4 | 18.1 | 49.8 | 29.8 | 1.0 | 84.2 | 2.75 |
| (B)-2 | 33.8 | 35.2 | 26.2 | 36.0 | 32.0 | 3.0 | 81.5 | 1.37 |
| (B)-3 | 37.3 | 34.3 | 19.4 | 41.4 | 34.7 | 3.5 | 72.8 | 2.13 |

(*)1,3-disaturated-2-oleoylglycerol (SOS) content determined by high performance liquid chromatography[cf. Prog. Lipid. Res., 21, 179~181 (1982)].

EXAMPLES 1 to 5

The substitute compositions for cacao butter of the present invention were prepared by blending the oleaginous compositions (A) and the oleaginous compositions (B).

As the oleaginous composition (A), the samples (A)-1, (A)-2, (A)-3 and (A)-4 as obtained in the above-mentioned Preparation Example were employed. The samples (B)-1, (B)-2 and (B)-3 as obtained in the above-mentioned Preparation Example were employed as the oleaginous composition (B). Table 4 shows the blending ratios of the oleaginous compositions (A) and (B) in each Example.

TABLE 4

| | Substitute composn. for cacao butter | | Blending ratio (A):(B) |
| | Oleag. composn. (A) | Oleag. composn. (B) | |
|---|---|---|---|
| Ex. 1 | (A)-1 | (B)-1 | 20:80 |
| Ex. 2 | (A)-2 | (B)-2 | 20:80 |
| Ex. 3 | (A)-3 | (B)-1 | 20:80 |

TABLE 4-continued

| | Substitute composn. for cacao butter | | Blending ratio (A):(B) |
| | Oleag. composn. (A) | Oleag. composn. (B) | |
|---|---|---|---|
| Ex. 4 | (A)-1 | (B)-3 | 20:80 |
| Ex. 5 | (A)-4 | (B)-1 | 20:80 |

A chocolate was produced with the use of each substitute composition for cacao butter as shown in Table 4.

| Composition of chocolate: | |
|---|---|
| Component | % by weight |
| powdery sugar | 40 |
| cacao mass | 35 |
| substitute composition for cacao butter | 18 |
| nonskim milk | 7 |
| lecithin | 0.3 |

These components were ground in a conventional manner and conched at 55° C. for 48 hours. After cooling under stirring, the conched chocolate solution was tempered and molded followed by cooling in a refrigerator for 30 minutes. The chocolate thus produced was aged for two weeks at 20° C. and then subjected to tests. Table 5 shows the results.

TABLE 5

| | Workability | Snapping | In-mouth meltability | Resistancce to blooming |
|---|---|---|---|---|
| Ex. 1 | ◉ | ◉ | ◉ | 80 |
| Ex. 2 | ◉ | ◉ | ◐ | 72 |
| Ex. 3 | ◉ | ◉ | ◉ | 75 |
| Ex. 4 | ◉ | △ | ◉ | 41 |
| Ex. 5 | ◉ | ◉ | ◉ | 65 |
| Cacao fat(*) | ◉ | ◉ | ◉ | 12 |

Criteria:

Workability:

◉: no increase in viscosity;
△: slight increase in viscosity; and
x: too viscous to be molded.

Snapping and in-mouth meltability:

◉: good;
△: somewhat poor; and
x: poor.

Resistance to blooming:

The number of cycles (23° C. for 4 hours and 32° C. for 4 hours) repeated until fat blooming occurred.
Note: A chocolate produced by replacing the substitute composition for cacao butter in the composition by cacao fat.

Table 5 suggests that the chocolates produced with the use of the substitute compositions for cacao butter of the present invention show an obviously improved resistance against blooming compared with the one comprising cacao fat.

EXAMPLE 6

In order to examine appropriate blending ratios of the oleaginous compositions (A) and (B) constituting the substitute composition for cacao butter of the present invention, chocolates produced with the use of substitute compositions for cacao butter comprising the oleaginous compositions (A)-1 and (B)-1 as obtained in the abovementioned Preparation Examples were evaluated. Table 6 shows the results. The production and evaluation of the chocolates were carried out in the same manners as those described in Examples 1 to 5.

TABLE 6

| Substitute composn. for cacao butter Oleag. composn. (A-1): Oleag. composn. (B-1) | Evaluation of chocolate | | | |
|---|---|---|---|---|
| | Work-ability | Snap-ping | In-mouth melt-ability | Resistance to blooming |
| 0:100 | ◎ | ◎ | ◎ | 20 |
| 2:98 | ◎ | ◎ | ◎ | 22 |
| 5:95 | ◎ | ◎ | ◎ | 45 |
| 20:80 | ◎ | ◎ | ◎ | 80 |
| 45:55 | △ | △ | △ | 71 |
| 70:30 | △ | △ | x | 47 |
| 100:0 | x | x | x | |

Table 6 obviously suggests that the resistance against blooming would increase with an increase in the oleaginous composition (A) while the workability, snapping and in-mouth meltability would decrease therewith. Thus it is desirable to blend 5 to 60% by weight of the oleaginous composition (A) with 40 to 75% by weight of the oleaginous composition (B) to give a remarkable resistance against blooming together with satisfactory properties as a chocolate.

EXAMPLE 7

The effectiveness of the oleaginous composition (B) containing at least 70% by weight of 1,3-disaturated-2-oleoylglycerols and constituting the substitute composition for cacao butter of the present invention was examined. Oleaginous compositions (B) comprising stearic and palmitic acids at various ratios were prepared by blending the sample (B)-1 as obtained in the abovementioned Preparation Example and the PMF and SMF as obtained in Referential Examples 1 and 2. Table 7 shows the employed oleaginous compositions (B).

TABLE 7

| Oleag. composn. (B) | Composn. (% by wt.) | | | Stearic acid/palmitic acid in oleag. composn. (B) |
|---|---|---|---|---|
| | (B)-1 | PMF | SMF | |
| (B)-4 | 70 | 30 | 0 | 1.22 |
| (B)-5 | 85 | 15 | 0 | 1.80 |
| (B)-6 | 50 | 0 | 50 | 4.49 |

TABLE 7-continued

| Oleag. composn. (B) | Composn. (% by wt.) | | | Stearic acid/palmitic acid in oleag. composn. (B) |
|---|---|---|---|---|
| | (B)-1 | PMF | SMF | |
| (B)-7 | 20 | 0 | 80 | 6.87 |
| (B)-1 | 100 | 0 | 0 | 2.75 |

The sample (A)-1 as obtained in the above-mentioned Preparation Example was employed as the oleaginous composition (A) and blended with each of the oleaginous compositions (B) as shown in Table 7 to give a substitute composition for cacao butter. A chocolate was produced with the use of the substitute composition for cacao butter thus obtained and evaluated. The production and evaluation of the chocolate were carried out in the same manners as those described in Examples 1 to 5. Table 8 shows the results of the evaluation.

TABLE 8

| Substitute composn. for cacao butter | Evaluation of chocolate | | | |
|---|---|---|---|---|
| | Work-ability | Snapping | In-mouth meltability | Resistance to blooming |
| (A)-1:(B)-4 (20:80) | ◎ | △ | ◎ | 19 |
| (A)-1:(B)-5 (20:80) | ◎ | ◎ | ◎ | 46 |
| (A)-1:(B)-6 (20:80) | ◎ | ◎ | ◎ | 41 |
| (A)-1:(B)-7 (20:80) | ◎ | ◎ | △ | 18 |
| (A)-1:(B)-1 (20:80) | ◎ | ◎ | ◎ | 80 |

Table 8 obviously suggests that substitute compositions for cacao butter of the present invention containing an oleaginous composition (B) wherein the ratio of stearic acid to palmitic acid in the constituent fatty acid residues is from 1.5:1 to 6.0:1 are highly resistant against fat blooming.

What is claimed is:

1. A substitute composition for cocoa butter which comprises 5 to 60% by weight of an oleaginous composition (A) and 40 to 95% by weight of another oleaginous composition (B) each as specified hereinbelow;
   (A) an oleaginous composition which comprises 40 to 100% by weight of mixed acid triglyceride(s) containing 15 to 70% by weight of saturated fatty acid(s) having 20 to 24 carbon atoms and 20 to 60% by weight of unsaturated fatty acid(s) having 16 to 22 carbon atoms as constituent fatty acids and containing at least one saturated fatty acid residue having 20 to 24 carbon atoms and at least one unsaturated fatty acid residue having 16 to 22 carbon atoms per molecule; and (B) an oleaginous composition which contains at least 70% by weight of 1,3-disaturated-2-oleoylglycerols comprising 1,3-dipalmitoyl-2-oleoylglycerol, 1-palmitoyl-2-oleoyl-3-stearoylglycerol and 1,3-distearoyl-2-oleoylgylcerol and shows a weight ratio of stearic acid to palmitic acid in the constituent fatty acid residues of 1.5:1 to 6.0:1.

* * * * *